July 1, 1958
J. A. ADLOFF
2,841,028
GEAR-SHIFT MECHANISM FOR MOTOR VEHICLES
Filed April 6, 1953
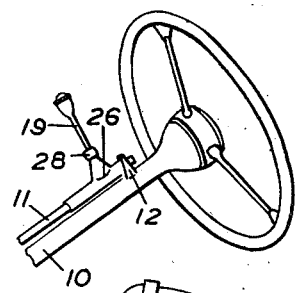
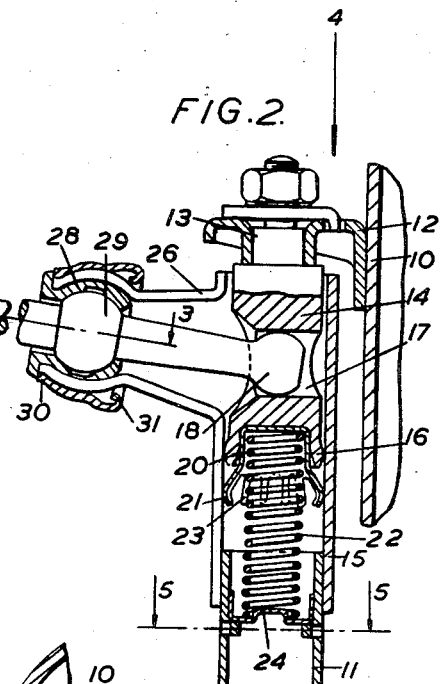
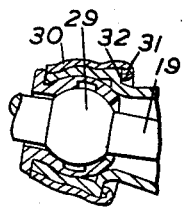
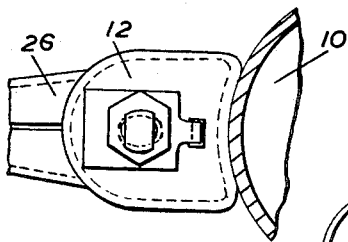
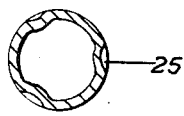
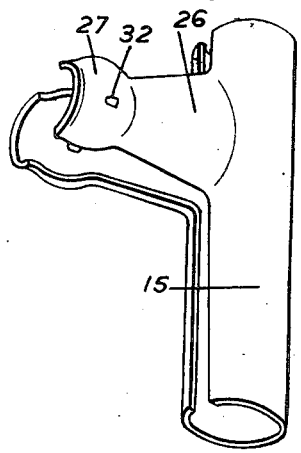
Inventor
Jakob August Adloff
By Willits, Helwig & Bailes
Attorneys

United States Patent Office 2,841,028
Patented July 1, 1958

2,841,028

GEAR-SHIFT MECHANISM FOR MOTOR VEHICLES

Jakob August Adloff, Mainz-Gonsenheim, Germany, assignor to General Motors Corporation, Detroit, Mich., a corporation of Delaware Application April 6, 1953, Serial No. 347,020

Claims priority, application Germany April 8, 1952

12 Claims. (Cl. 74—484)

The invention relates to a gear-shift mechanism for motor vehicles.

It is particularly concerned with such mechanisms having a hand lever arranged close beneath the steering wheel and adapted to move a gear-shift rod which is slidably supported parallel to the steering column and is in turn mounted in a fixed pin on the latter.

The mountings for such hand levers have heretofore consisted of several parts which were screwed together or welded, and were consequently relatively expensive to produce.

The present invention has for its object to simplify the mounting for the gear-shift lever and to reduce its costs of manufacture.

According to the invention, the mounting for the gear lever consists of a one-piece head formed or stamped from sheet metal and attached to the gear-shift rod or tube. The sheet stamped from the flat piece is symmetrically folded or bent after stamping so that it forms a housing which is thereupon held together preferably by a bush slipped over its spherical head.

The bush rests with a flange behind lugs on the spherical head which are produced by stamping or upsetting. In this simple manner the bush is thus secured against becoming loose.

The assembly and dismantling of the gear-shift lever are facilitated considerably by this invention.

How the invention can be put into practice is hereinafter described in detail with reference to the accompanying drawings in which:

Figure 1 is a perspective view of a steering wheel of an automobile with the gear-shift lever mounted on the steering column in accordance with the invention;

Figure 2 is a longitudinal section of the head of the gear-shift tube fitted in position;

Figure 3 is a section along the line 3—3 in Figure 2;

Figure 4 is a view of part of the head of the gear-shift tube in the direction of the arrow 4 in Figure 2;

Figure 5 is a section along the line 5—5 in Figure 2; and

Figure 6 is a perspective view of the head of the gear-shift tube.

In the drawings the stationary steering column 10 of the automobile carries an axially displaceable and rotatable gear-shift rod 11 in the form of a tube arranged parallel to the steering column in known manner. Mounted on the steering column is a gear-shift tube support or bracket 12 in the bore of which a cylindrical member or guide pin 14 is secured so as to be incapable of rotation and so as to support the cylindrical portion of the gear-shift tube head 15 (Fig. 1) which forms the upper extremity of the tube 11 and with which it is rigidly connected. For this purpose the guide pin has an annular beading 16. A cross-bore 17 in the guide pin 14 locates and supports a spherical head 18 of a hand gear lever 19.

A depression 20 at the bottom end of the guide pin 14 contains a spring washer 21 and a helical spring 22. The spring washer 21 has evenly spaced lugs 23 which contact with the adjacent inner wall of the tube head 15, so as to elastically support the head 15 and prevent rattling.

At its lower end, the helical spring 22 thrusts against a plate 24 which is held in the gear-shift tube 11 (see Figure 5), by three indentations 25. The helical spring 22 facilitates the gear changing and biases the hand lever 19 and shift rod 11 and the parts positively connected to it into the pre-selective position of that gear ratio most used; for example in the case of three-speed gearing, into the pre-selection position for the second and third speed ratios.

The gear-shift tube head 15 stamped from one piece of sheet metal according to the invention has a laterally extending tapered shank 26 formed of two halves the outer extremities of which form a ball socket 27 (Figure 6).

As is clear from Figure 6 the head 15 is stamped and then folded or bent so that the edges of the cylindrical part come opposite one another, and so that the two halves of the shank 26 are likewise juxtaposed. The respective edges are adapted to contact in a radial plane containing the axis of the tubular head 15 and tube 11.

The socket 27 contains a hollow spherical damping element 28 (Figure 2) of rubber in which the spherical head 29 of the gear lever 19 is embedded. The damping element 28, socket 27 and head 29 are so proportioned that the element 28 is under compressive stress in the embedded condition. By adopting this measure, dimensional inaccuracies are compensated in simple manner whilst at the same time any vibrations transmitted from the gear to the shift lever are damped out.

In order to hold the head of the gear-shift tube 15 in the closed condition a bush 30 is pushed (leftwards in Figure 2) over the ball socket 27. This bush or collar has an inner flange 31 which snaps behind two lugs 32 (Figures 3 and 6) formed in the ball socket 27 of the head 15 by stamping in or by upsetting so as to prevent the bush from automatically loosening itself.

The operation of the mechanism is as follows: If the hand gear lever 19 is moved in the plane of the drawing of Figure 2, the spherical head 29 describes a circular arc about the mid-point of the fixed spherical head 18. The result is that the shift rod 11 is moved longitudinally of itself and the desired pre-selection position is assumed in the gear box (not shown) in known manner.

If the gear lever 19 is swung perpendicular to the plane of the drawing in Figure 2, the spherical head 29 turns the gear-shift tube head 15 about the longitudinal axis of the shift rod 11, and as a result, the particular pre-selected individual gears in the gear box come into engagement.

I claim:

1. Gear-shift mechanism comprising a cylindrical support, a rod slidably and rotatably mounted on said support, a manually operable lever pivoted on said support and adapted to effect slidable and rotatable movements of said rod, an interconnection between said lever and said one end of said rod comprising a split sheet metal member shaped to enclose said support in part and to form a spherical socket bearing for said lever and a bushing and collar enclosing split portions of said member around said socket.

2. Gear-shift mechanism comprising a support, a rod slidably and rotatably mounted on said support, a manually operable lever pivoted on said support and adapted to effect slidable and rotatable movements of said rod, an interconnection between said lever and said one end of said rod comprising a sheet metal member shaped to enclose said support in part and to form a spherical socket bearing for said lever, and a bush enclosing and detachably retained on said socket.

3. Gear-shift mechanism comprising a support, a rod slidably and rotatably mounted on said support, a manually operable lever pivoted on said support and adapted to effect slidable and rotatable movements of said rod, and interconnection between said lever and said one end of said rod comprising a sheet metal member shaped to enclose said support in part and to form a spherical socket bearing for said lever, lugs externally of said socket and a bush enclosing the socket and retained by said lugs.

4. Gear-shift mechanism comprising a fixed guide support, a manually operable lever having a spherical head and pivoted on said support, a rod slidable and rotatable relative to said support, an interconnection between said support, said rod, and said lever comprising a sheet metal member formed of a tubular part fixed to said rod and slidably guided on said support, and a shank part at right angles to said tubular part forming a spherical socket for the spherical head on said lever, and a bushing enclosing said socket and retaining the same firmly enclosed upon said spherical head.

5. Gear-shift mechanism comprising a support, a rod slidably and rotatably mounted at one end on said support, a manually operable lever pivoted on said support and adapted to effect slidable and rotatable movements of said rod, an interconnection between said lever and said one end of said rod comprising a sheet metal member bent to tubular form to fit to and be slidable on said support and to provide a spherical socket bearing for said lever, a damper element of resilient material within said bearing, and a bushing enclosing said socket.

6. Gear-shift mechanism comprising a fixed support including a bracket and a cylindrical member clamped together, a slidable and rotatable shift rod guidably mounted on and surrounding said support, a hand lever pivoted on said support, a ball and socket connection between said rod and said lever intermediate the ends of the latter, and a bushing engaging and surrounding said connection.

7. Gear-shift mechanism comprising a fixed support, a slidable and rotatable shift rod guidably mounted on and surrounding said support, a hand lever pivoted on said support, a ball and socket connection between said rod and said lever intermediate its ends, a damping device of resilient material between said ball and said socket, and a bushing engaging and surrounding said connection.

8. The combination of an automobile steering column and gear-shift mechanism comprising a fixed support on said column, a slidable and rotatable shift rod guidably mounted on and surrounding said support and parallel to said column, a hand lever pivoted on said support, a ball and socket connection between said rod and said lever intermediate the ends of the latter, and a bushing detachably engaging and surrounding said connection.

9. Gear-shift mechanism comprising a fixed support, a slidable and rotatable shift rod guidably mounted and surrounding on said support, a laterally extending hand lever pivoted on said support, a ball and socket connection between said rod and said lever intermediate the ends of the latter, a damper of resilient material between said ball and said socket, lugs externally of said socket, and a bushing engaging said lugs and surrounding said connection.

10. Gear-shift mechanism comprising a fixed support, a slidable and rotatable shift rod guidably mounted on and surrounding said support, a hand lever pivoted on said support, a laterally projecting arm on said rod, a ball and socket connection between said arm and said lever intermediate the ends of the latter, and a bushing engaging and surrounding said connection.

11. Gear-shift mechanism comprising a fixed support, a slidable and rotatable shift rod guidably mounted on and surrounding said support, a hand lever pivoted at one end on said support, a laterally projecting hollow arm on said rod, a ball and socket connection between said arm and said lever intermediate the ends of the latter, a resilient damper in said connection, and a bushing detachably engaging and surrounding said connection.

12. The combination of a motor vehicle steering column and gear-shift mechanism comprising a fixed support, a slidable and rotatable shift rod guidably mounted on said support and parallel to said column, a hand lever pivoted on and surrounding said support, a hollow sheet metal laterally projecting arm on said rod, a ball and socket connection between said arm and said lever intermediate the ends of the latter and a bushing engaging and surrounding said connection.

References Cited in the file of this patent

UNITED STATES PATENTS

| | | |
|---|---|---|
| 2,302,901 | Wahlberg | Nov. 24, 1942 |
| 2,312,989 | Lavarack | Mar. 2, 1943 |
| 2,334,421 | Leach | Nov. 16, 1943 |
| 2,377,700 | Kurtz | June 5, 1945 |
| 2,584,058 | Squire | Jan. 29, 1952 |
| 2,631,467 | Lincoln | Mar. 17, 1953 |

UNITED STATES PATENT OFFICE
CERTIFICATE OF CORRECTION

Patent No. 2,841,028                        July 1, 1958

Jakob August Adloff

It is hereby certified that error appears in the printed specification of the above numbered patent requiring correction and that the said Letters Patent should read as corrected below.

Column 3, line 34, after "member" insert the words -- with shoulders --; column 4, line 33, after "on" and before "said" insert -- and surrounding --; line 34, strike out "and surrounding".

Signed and sealed this 28th day of October 1958.

(SEAL)

Attest:

KARL H. AXLINE

Attesting Officer

ROBERT C. WATSON

Commissioner of Patents